United States Patent [19]

Patterson

[11] 4,246,223

[45] Jan. 20, 1981

[54] METHOD AND APPARATUS OF MAKING A COMPARTMENT TRAY

[75] Inventor: Willis C. Patterson, Marion, Ohio

[73] Assignee: Peerless Machine and Tool Corporation, Marion, Ind.

[21] Appl. No.: 962,206

[22] Filed: Nov. 20, 1978

Related U.S. Application Data

[62] Division of Ser. No. 890,269, Mar. 27, 1978, Pat. No. 4,149,841.

[51] Int. Cl.³ .............................................. B29D 7/24
[52] U.S. Cl. .................................. 264/292; 264/322; 264/324; 264/325
[58] Field of Search ............... 264/292, 324, 322, 325; 93/35 PC

[56] References Cited

U.S. PATENT DOCUMENTS

| 3,054,144 | 9/1962 | Goodwin | 264/324 X |
| 3,172,927 | 3/1965 | Mojonnier | 264/550 |
| 3,663,146 | 5/1972 | Roffey | 264/550 X |

*Primary Examiner*—Thomas P. Pavelko
*Attorney, Agent, or Firm*—Jenkins, Coffey, Hyland, Badger & Conard

[57] ABSTRACT

A deep compartment tray includes compartments separated by dividers which extend to between one-third and substantially the full depth of the tray. The tray is constructed from sheet material, such as polyester coated paper milk carton stock by cutting blanks from the stock, scoring the blank in regions where formation of wrinkles is to be avoided to induce the paper stock to fold and form as required, and pre-forming and finally forming the blank into the tray between a single set of dies. The pre-forming step and the forming step are conducted by a first female die defining the tray cavities or compartments, and surrounded by a first draw pad region, and a second male die including bosses or land areas in the compartment regions and recesses where the tray dividers are to be formed. The male die includes a set of cavities, one in each of the tray compartment regions. The cavities slidably receive plungers or inserts which are movably mounted in the cavities and are spring-urged to their fully projected positions in the cavities. A second draw pad surrounds the male die, and is mounted for resistive movement relative to the male die. As the male die approaches the female die in a forming stroke, the first and second draw pads capture the blank. At the same time, the plungers contact the blank surface. As the forming stroke continues, the plungers pre-form the blank in the compartment regions between divider ridges on the female die while tension is maintained on a perimetral flange portion of the blank by the draw pads. The plungers finally bottom out, capturing the blank between themselves and the compartment surfaces of the female die. The remaining parts of the male die continue downward, finally forming the tray.

8 Claims, 8 Drawing Figures

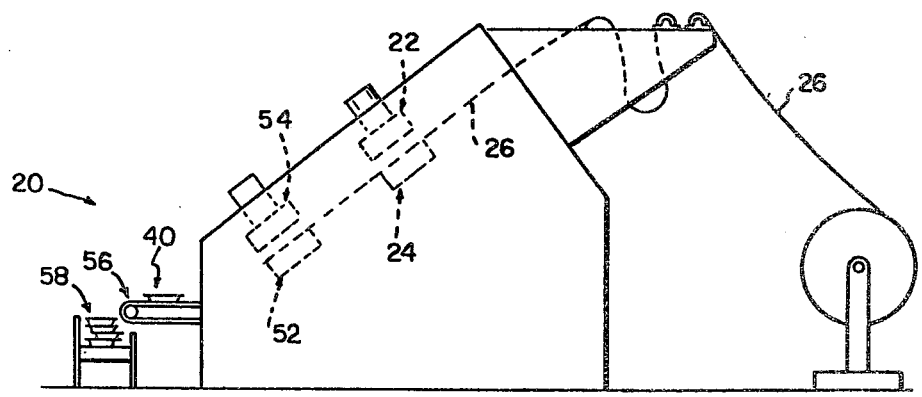
FIG. 1
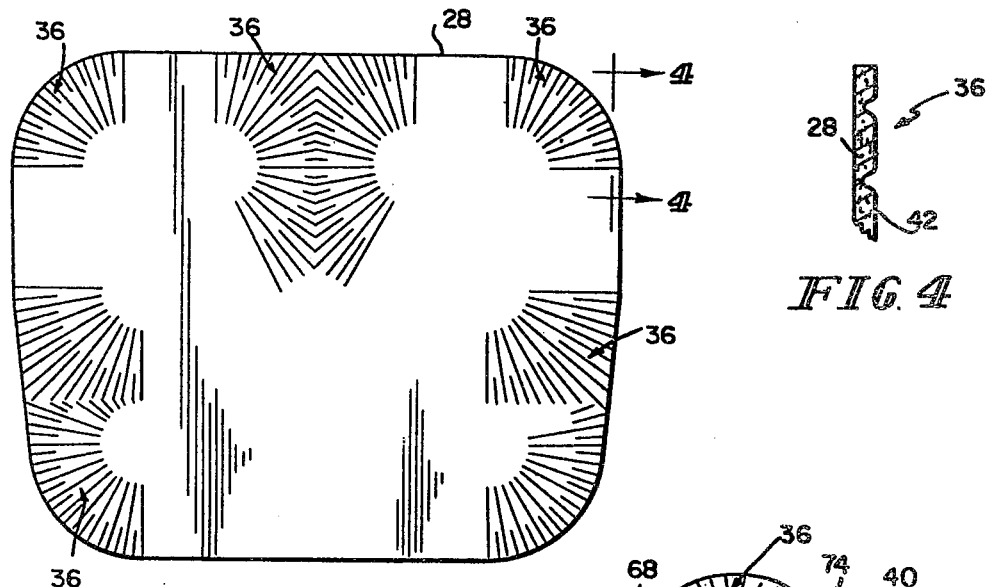
FIG. 3
FIG. 4
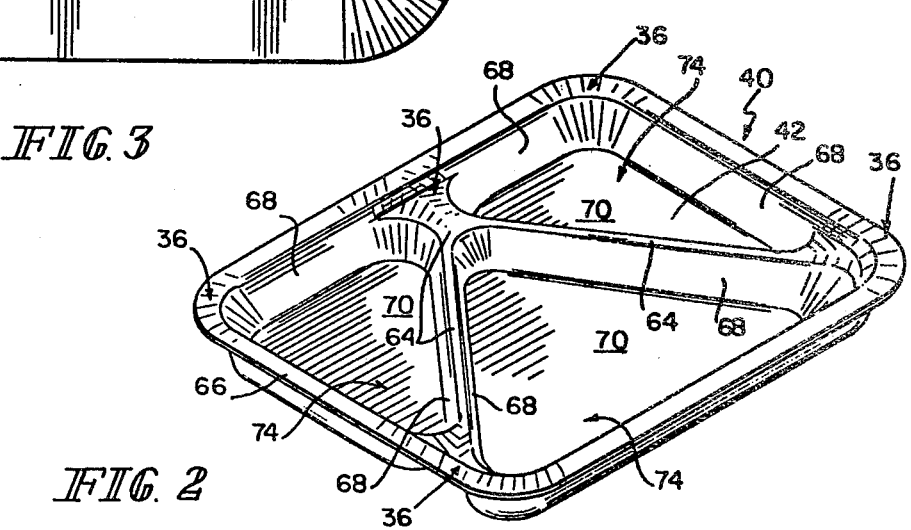
FIG. 2

METHOD AND APPARATUS OF MAKING A COMPARTMENT TRAY

This is a division of application Ser. No. 890,269 filed Mar. 27, 1978 now U.S. Pat. No. 4,149,841.

This invention relates to an apparatus and method for deep-drawing a compartment tray having ribs or ridges separating the various compartments.

In the art of constructing compartment trays by drawing paper stock, it has been difficult to draw trays wherein the dividers between tray compartments were more than one-third to one-half the depth of the tray. Typically, when it was required to draw a tray with dividers of greater height, some other material, such as aluminum foil, was used. With the increasing popularity of heat-and-serve foods, the need for apparatus and methods for forming less expensive materials, such as paper stock, into compartment trays has increased. However, the inability to deep draw dividers in paper trays has been an obstacle to their satisfactoriness for many applications.

Of course, many types of apparatus for drawing sheet material are known. There are, for example, the structures illustrated in the following U.S. Pat. Nos.: 3,634,579; 4,071,598; 3,983,827; 3,054,144; 3,532,785; 3,370,118; 3,584,109; 3,352,268; 3,868,919; 3,751,552; 3,695,806; 3,357,053; 3,444,282; 3,912,438; 3,755,528; 3,214,797; 3,375,551; 3,173,174; 3,418,690; 3,081,491; 2,568,698; 2,595,046; and 2,492,886.

It is an object of the present invention to provide an apparatus including a pair of draw pads, at least one of which is movable with, and resistively movable with respect to, its associated die member, to maintain tension on a sheet material blank as the blank is formed into an article.

Another object of the present invention is to provide mating first, or female, and second, or male, die members cooperatively defining a space corresponding to the shape of a compartment tray, in which the second die includes inserts or plungers in regions corresponding to the tray compartments, and in which the plungers are yieldably urged to their fully extended positions with respect to the male die. As the male die executes a forming stroke with respect to the female die, the die surfaces of the plungers first contact the sheet material as it is held between the draw pads to pull it, under tension, between the draw pads and pre-form it. The plunger die surfaces bottom out, capturing compartment portions of the blank between themselves and the die surfaces of the female die. During the rest of the forming stroke, the remaining parts of the male die move into tray-forming orientation with respect to the female die, as the plungers are urged into their retracted positions in the male die.

Another object of the present invention is to provide apparatus for forming a deep drawn compartment tray in which scoring takes place on the inside surface of the tray blank in regions where the dividers are to be formed. The scoring is not completely through the sheet material, and is performed to induce the sheet material to fold and form in desired regions, and to control the formation of wrinkles in the tray. The term "inside surface" as used herein means the surface of the blank with which the male die comes into contact during tray formation.

According to the invention, a die set for forming sheet material into a tray having side walls of a predetermined depth with ridges or dividers diving the tray into compartments, and in which the ridges have a height from one-third of the tray depth to substantially the full depth of the tray, comprises a first, or female, die and a mating second, or male, die. The female die provides upstanding ridges defining the tray ridges, and outer walls inclined upwardly and outwardly to define the tray side walls. A first draw pad is provided which is stationary with respect to the first die. The draw pad extends perimetrally about the female die and outwardly from the upper edge of the outer wall of the first die. The male die provides inserts or plungers, which project into respective compartment spaces defined by the female die ridges. The plungers are movably mounted in cavities in the male die for movement between fully retracted positions within the cavities and fully extended positions. Spring means yieldably urge the plungers to their fully extended positions, projected toward the female die. A second draw pad is provided for holding the sheet material against the first draw pad to provide a predetermined tension on the material during the forming process. The second draw pad is movably supported with respect to the male die and extends about its perimeter in registry with the first draw pad.

Means are provided for resistively movably mounting the second draw pad with respect to the male die. The resistance of the second draw pad to movement with respect to the male die is selectively variable. The means includes at least one friction pad disposed between the male die and the second draw pad and selective adjustment means supporting the friction pad against a surface of the male die, the selective adjustment means being movably supported in the second draw pad and accessible for adjustment of the pressure applied by the friction pad to the surface of the male die to adjust the resistance to movement of the second draw pad with respect to the male die.

The illustrative apparatus further includes knock-out plunger means actuable to remove the finished tray from the female die, the knock-out means being mounted in the female die.

Further, and illustratively, at least one of the female and male dies is heated.

The illustrative sheet material is paper stock. The paper stock is scored in bend regions adjacent ridges and corners of the tray to relieve stresses occurring during the forming operation, and to control the formation of wrinkles in the paper stock. A typical paper stock is one coated with a thermoplastic resin on the side opposite the side which contacts the heated die.

The method of the present invention includes pre-forming the sheet material by engagement of the sheet material between surfaces of a female die corresponding to the tray compartments, and plungers, which are movably mounted in respective portions of a male die corresponding to the tray compartments. Movement of the male die toward the female die during a forming stroke first causes the plungers to contact the sheet material to pre-form it, as the sheet material is drawn between first and second draw pads under tension. Finally, the remaining die surfaces of the male die are moved into tray-forming orientations with respect to the female die as the plungers are urged back into their respective cavities in the male die.

The illustrative method includes the step of cutting the sheet material from a web to provide a tray blank, which is formed into the tray.

The illustrative method further includes the step of scoring the blank to a depth less than the thickness of the material before it is formed into a tray, the scoring controlling the formation of wrinkles in the material as the tray is formed.

Illustratively, the sheet material is paper stock, and the method further includes the step of moistening the stock before it is formed. The paper stock is moistened to a moisture content of between 5% and 20% by weight, and the preferred range of moisture content is from approximately 10% to approximately 12% by weight. An illustrative paper stock is of a type generally referred to as "milk carton stock" and is coated on one side. The coating is polyester, although other types of coatings, such as nitrocellulose, can be used for particular applications.

The invention may best be understood by referring to the following description and accompanying drawings which illustrate the invention. In the drawings:

FIG. 1 is a diagrammatic side elevational view of an apparatus for performing the method of the present invention;

FIG. 2 is a top plan view of a paper stock blank from which the compartment tray of FIG. 3 is formed;

FIG. 3 is a perspective view of the compartment tray constructed according to the present invention;

FIG. 4 is a fragmentary sectional view taken generally along section lines 4—4 of FIG. 2;

Figure 5:
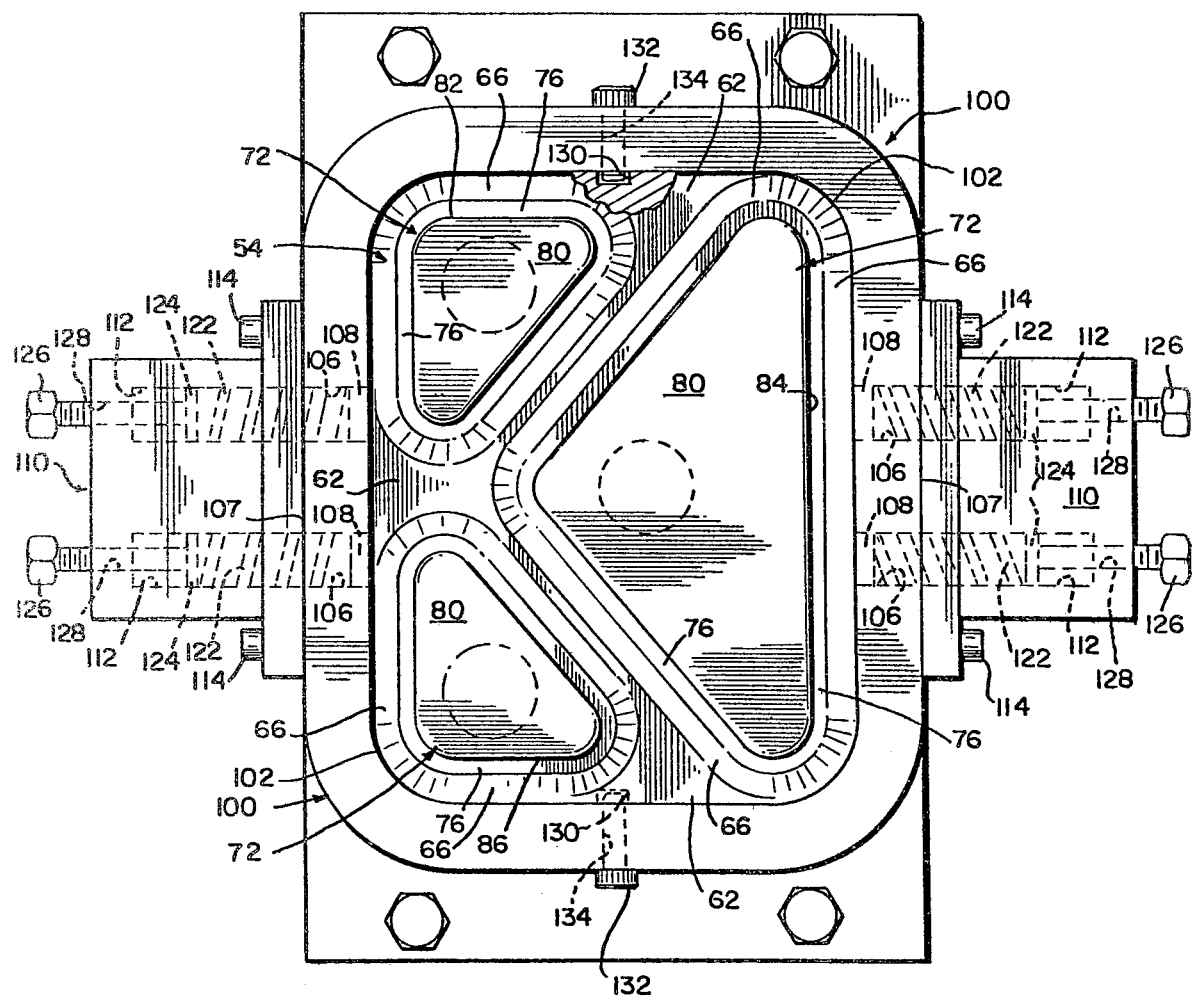
FIG. 5 is a plan view, partly broken away, of the second, or male die, and second draw pad according to the present invention.

The apparatus 20 of FIG. 1 includes a blank punch 22 and an associated die 24 for generating tray blanks from a web 26, which is illustratively paper milk carton stock. The blanks are scored in selected regions at the same time that they are blanked by the punch 22 and die 24 from the web of sheet material. An illustrative scoring scheme is illustrated in FIG. 3, wherein a blank 28 is scored in regions where it is to be drawn and where there are to be corners in the finished tray 40, illustrated in FIG. 2. The scored regions are indicated by the reference numerals 36 in FIGS. 2-3. The scoring in this instance is not cutting completely through the paper carbon stock. See FIG. 4. Rather, it is a cutting or molding of one of the surfaces of the paper stock and to a predetermined depth between the surfaces of the paper stock. A main purpose of the scoring is to control the formation of wrinkles in the finished tray. Specifically, the scoring causes the wrinkles to form in the scored regions 36. Regarding the depth of the score lines, in a paper stock which is 0.5969 milimeters in thickness and has a polyester coating approximately 0.0635 milimeters thick on the upper side 42 thereof, for a total thickness of approximately 0.6604 milimeters, a scoring depth of approximately 0.4064 milimeter is satisfactory. In this regard, it should further be noted that the term "scoring" as used herein is intended to include, without limitation, those processes in which relative lateral movement occurs between the surface being scored and the surface performing the scoring, as well as those processes, normally called "coining," in which the scoring is performed by movement of the surface being scored directly toward the surface performing the scoring operation.

Further regarding the scoring operation, reference is here made to U.S. Pat. Nos. 2,997,927; 3,033,434; and 3,983,827.

After blanks 28 are formed and scored between blanking punch 22 and blanking die 24, they are gravity-fed in an aligned orientation down a chute 50 (FIG. 1) to a location between a first, or female, die 52 and an associated, movable second, or male, die 54. Reciprocation of the male die 54 toward the female die 52 in a forming stroke forms the finished tray 40 (FIG. 3) from the scored blank 28. As the male die 54 reciprocates away from the female die 52, a knock-out punch associated with the female die 52 ejects the finished tray 40 from the female die, and the finished tray 40 falls onto an outfeed conveyor 56 along which it is conveyed to a stack 58. Subsequently, the finished trays 40 in stack 58 are transported to another location where a trimming operation is performed on the trays 40 to cut the perimetral flanges 60 (FIG. 2) of the trays to a desired size and shape.

Turning now to FIG. 5, the construction of the male die 54 and its associated components will be described. Male die 54 includes a flat, depressed base region 62 which corresponds to the raised regions 64 of tray 40 (FIG. 3). The die 54 surface projects upwardly and tapers in the die regions 66 corresponding to the side walls 68 of the various compartments 70 of tray 40 (FIG. 3). The die 54 surface includes flat "plateau" regions 72 corresponding to the bottoms 74 of the various compartments 70 in tray 40 (FIG. 3). Each of the regions 72 is comprised of two portions, an outer perimetral portion 76 provided by the main body of die 54 itself, and an inner portion provided by the downwardly facing bottom surface 80 of a die 54 insert of plunger. A plunger 82, 84, 86 is provided for each of the portions 72, corresponding, to each of the compartments 70 of finished tray 40 (FIG. 3). Plungers 82, 84, 86 are movably mounted in die 54, and are normally urged to fully projected positions out of the die surface of die 54.

A movable draw pad 100 is associated with die 54. Movable draw pad 100 is reciprocably supported about the outer wall 102 of die 54. Referring to both FIGS. 5 and 6 draw pad 100 includes an inner surface 104 which conforms generally to the shape of outer wall 102 of die 54. Four openings 106 are provided in draw pad 100, two in each of two opposite side walls 107 thereof. Each opening 106 houses a frictional pad or brake pad 108. A brake spring housing 110 providing a pair of housing cylinders 112 is attached by cap screws 114 to each of sides 107. The cylinders 112 are in alignment with respective openings 106. Brake springs 122 are captured in the aligned cylinders 112 and openings 106 between respective brake pads 108 and spring stops 124 which are movably supported in cylinders 112 by adjustment bolts 126. Bolts 126 engage threaded openings 128 in the housing 110.

The movable draw pad 100 is captured on the outer wall 102 of die 54 by cooperating longitudinally extending slots 130 in the outer wall 102 of die 54 and cap screws 132 in threaded bores 134 of the movable draw pad 100. See FIG. 5. As best illustrated in FIG. 6, male die 54 is mounted above female die 52, and draw pad 100 is gravity urged toward its lowermost position (FIG. 6) with respect to die 54.

Figure 6:
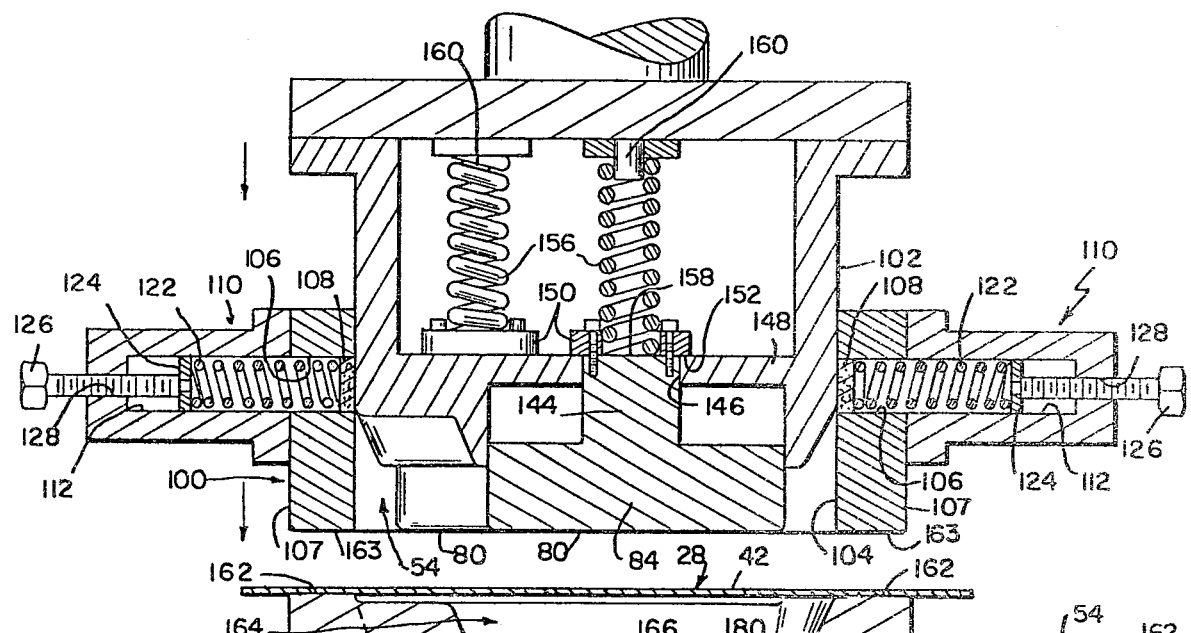
FIG. 6 is a sectional side elevational view of the die system of the present invention at the beginning of the downward forming stroke of the male die and second draw pad.
Figure 7:
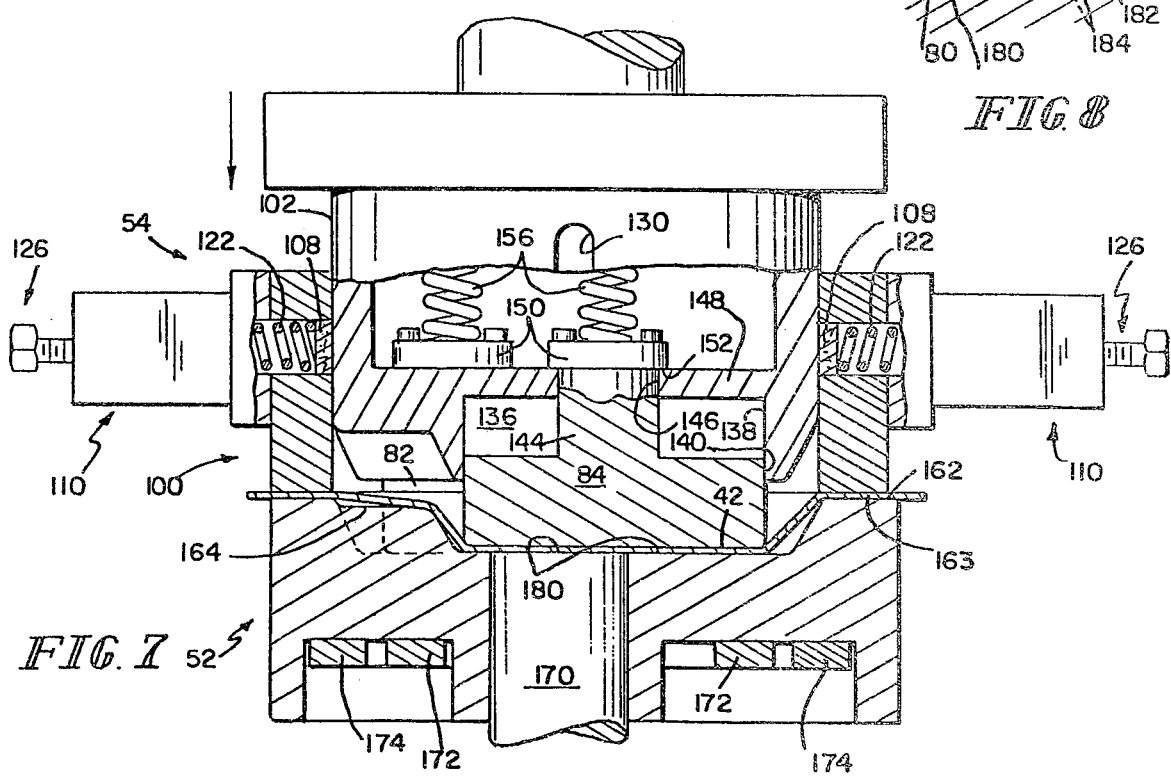
FIG. 7 is a sectional side elevational view of the apparatus of FIG. 6, in a subsequent phase of the downward forming stroke of the male die and second draw pad.

With particular reference to FIGS. 6–7, each of plungers 82, 84, 86 in die 54 is reciprocably mounted in a cavity 136. The side walls 138, 140, respectively, of cavity 136 and plunger 82, 84, 86 are formed to facilitate free sliding movement. Each plunger 82, 84, 86 includes a stem 144 which extends upwardly through a passageway 146 in the top wall 148 of its respective cavity 136. A cap 150 is attached to the top of each stem 144 as illustrated, the caps 150 providing downwardly facing surfaces 152 which cooperate with the top wall 148 surrounding each passageway 146 to stop downward motion of the plungers 82, 84, 86. The plungers 82, 84, 86 are urged to their fully projected position with respect to die 54 by plunger springs 156 captured in the centers 158 of caps 150 and on plunger spring support posts 160 mounted in the top of die 54.

The female die 52 includes a perimetrally extending flat surface 162 defining a draw pad which cooperates with surface 163 of draw pad 100 on the male die 54 side. The illustrative female die 52 includes a cavity 164 within the draw pad 162 region. The cavity 164 corresponds in shape to the underside of the finished tray 40 (FIG. 3), and includes raised dividers 166 (FIG. 6) in the finished tray 40 regions where walls 68 are formed between adjacent compartments 70. As best seen in FIG. 6, the dividers extend to substantially full depth of the finished tray 40, with allowance being made for the thickness of the material of blanks 28 being formed. The female die 52 is stationarily mounted in the apparatus 20 (FIG. 1) and includes a central knock-out punch 170 which is generally right circular cylindrical shape and is actuable to eject a finished tray 40 from the cavity 164. The illustrative female die 52 also includes two sets of heating coils 172, 174 which are actuable to heat the female die 52 and the blanks 28 being formed therein.

Referring now particularly to FIG. 6, as the male die 54 moves downward in a forming stroke, the surfaces 80 of plungers 82, 84, 86 initially contact the upper side 42 of blank 28. Simultaneously, the perimetral portions of blank 28 are captured between draw pads 100, 162. The tension on the brake pads 108 provided by brake springs 122 insures that, as the downward forming stroke of die 54 continues, slipping of the blank 28 into the cavity 164 is controlled by the force exerted downwardly by die 54, coupled through the brake pads 108 to the movable draw pad 100. To achieve the desired force exerted downward on the blank 28 by the movable draw pad 100, bolts 126 can adjust the friction between the pads 108 and the outer wall 102 of die 54. This adjustment controls the rate at which the blank 28 material moves into the cavity 164 at the urging of plungers 82, 84, 86 during the formation of tray 40.

The illustrative web 176 of sheet material (FIG. 1) is on a roll. The roll is first moistened to from approximately 10% to approximately 12% by weight moisture. Then the web is fed into the apparatus 20 where it is blanked and scored (coined) as previously discussed. Then the blanks are fed downward between dies 52, 54 for forming.

As the blanks 28 are drawn, they are first contacted by the surfaces 80 (see FIG. 6). As the forming stroke of die 54 continues, the surfaces 80 of plungers 82, 84, 86 urge the compartment 70 regions of the blank 28 downwardly until the blank 28 is pre-formed and the surfaces 80 bottom out with the compartment 70 regions of blank 28 between themselves and the bottom 180 of cavity 164 in die 52. The pre-formed blank 28 is illustrated in FIG. 7.

Figure 8:
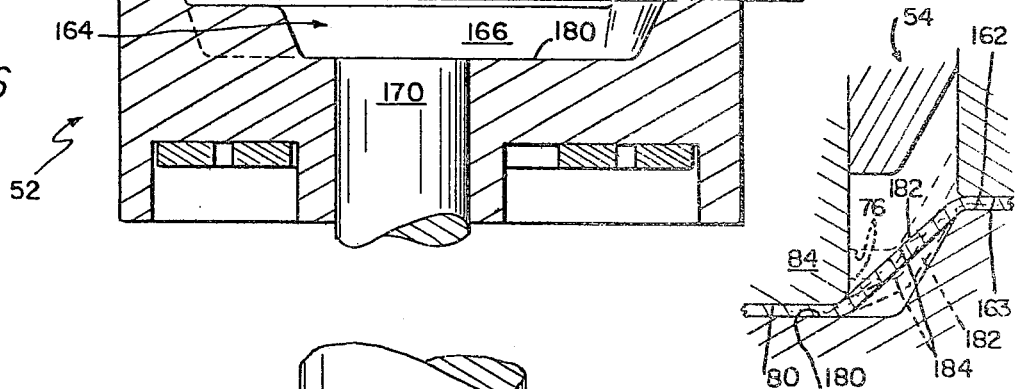
FIG. 8 is a detail of FIG. 7, with subsequent phases of the forming process being illustrated diagrammatically in broken lines.

As the forming stroke of die 54 continues, the remaining portions of die 54 begin to move downwardly and plunger springs 156 are compressed. At some point during the forming stroke, the remaining portions of die 54 contact the flaring side wall 182 of the pre-formed blank 28 (see FIG. 8). Continued downward movement of the remaining portions of die 54 flexes the flaring side wall 182 in the region 184, illustrated in FIG. 8. This forming continues until the perimetral portions 76 of die 54 are continuous with surfaces 80 of plungers 82, 84, 86, and the tray 40 is completely formed.

It will be appreciated that during the forming process, sufficient sheet material of blank 28 is drawn between draw pads 100, 162 and into the cavity 164 against the force exerted by the draw pads to form the tray. The forming and wrinkling of the tray 40 surface 42 is controlled by the positions of the scored regions 36 in blank 28.

To help set and drive moisture from the blank 28, it is frequently desirable to apply heat to one or the other or both of dies 52, 54. The illustrative apparatus includes heating coils 172, 174 in die 52 for that purpose. It should be noted, however, that when resin coated paper stock, such as standard milk carton stock, is used, heat generally will only be applied to the die which contacts the uncoated side of the blank. Typical resin coatings include polyester. Coatings of other types also useful in particular applications, e.g., nitrocellulose for trays for low temperature oven usage.

What is claimed is:

1. A method of deep-drawing from sheet material a container having a plurality of compartments separated by ridges, the sheet material being formed between mating male and female dies, the forming process including the step of pre-forming the sheet material by engagement of the sheet material between surfaces of the female die corresponding to the plurality of container compartments and plungers which are movably mounted in portions of the male die corresponding to the plurality of container compartments, the plungers mounted in the male die to be yieldably urged outwardly from the male die, movement of the male die toward the female die during a forming stroke first causing the plungers to contact the sheet material to pre-form it, then causing the other parts of the male die to move into container-forming orientation with respect to the female die as the plungers are urged back into the male die.

2. The method of claim 1 and further comprising the step of scoring the sheet material to a depth less than the thickness of the material before it is formed into a container, the scoring controlling the formation of wrinkles in the material as the container is formed.

3. The method of claim 1 and further comprising the step of holding the sheet material between mating first and second draw pads to maintain tension on it as it is formed into a container.

4. The method of claim 3 wherein the first draw pad is fixed to the female die and the second draw pad is mounted for resistive movement with respect to the male die.

5. The method of claim 4 wherein the sheet material is captured between the first and second draw pads as the plungers contact it to begin the pre-forming step.

6. A method of forming from paper sheet stock a container having a plurality of compartments separated by ridges having heights of from one-third the full height to substantially the full height of the container, the forming process including the steps of engaging the paper sheet stock between first and second draw pads to maintain tension on the paper sheet stock during subsequent forming steps, pre-forming the paper sheet stock by engaging it between adjacent surfaces of a first die corresponding to the plurality of container compartments, and plungers which are movably mounted in portions of a second die corresponding to the plurality of container compartments, the plungers mounted in the second die to be yieldably urged outwardly from the second die, the first and second draw pads being associated with the first and second dies, respectively, relative movement of the first and second dies toward one another during a forming stroke causing the first and second draw pads to engage the paper sheet stock and causing the plungers to contact the paper sheet stock and pre-form it, then causing other surfaces of the second die to move into container-forming orientation with respect to the first die as the plungers are urged back into the second die.

7. The method of claim 6 wherein the first draw pad is fixed to the first die and the second draw pad is mounted for resistive movement with respect to the second die.

8. The method of claim 7 wherein the sheet material is captured between the first and second draw pads substantially simultaneously as the plungers contact the sheet material to begin the pre-forming step.

* * * * *